United States Patent
Morfit et al.

[11] 3,811,843
[45] May 21, 1974

[54] SOLVENT DEASPHALTING

[75] Inventors: Oliver Morfit, Green Village; John G. Ditman, Newark, both of N.J.

[73] Assignee: Foster Wheeler Corporation, Livingston, N.J.

[22] Filed: Feb. 22, 1973

[21] Appl. No.: 334,783

[52] U.S. Cl. ............... 23/270.5, 196/14.52, 261/84
[51] Int. Cl. ........................................... B01d 11/04
[58] Field of Search ................ 23/270.5; 196/14.52; 261/84

[56] References Cited
UNITED STATES PATENTS

| | | | |
|---|---|---|---|
| 2,273,660 | 2/1942 | Poole | 196/14.52 |
| 2,877,101 | 3/1959 | Rector | 196/14.52 |
| 2,893,846 | 7/1959 | Wistrich et al. | 23/270.5 |
| 3,015,545 | 1/1962 | Gross et al. | 23/270.5 |
| 3,627,675 | 12/1971 | Ditman et al. | 196/14.52 |

FOREIGN PATENTS OR APPLICATIONS

| 904,757 | 8/1962 | Great Britain | 23/270.5 |
|---|---|---|---|

*Primary Examiner*—Tim R. Miles
*Attorney, Agent, or Firm*—Marvin A. Naigur; John E. Wilson

[57] ABSTRACT

The invention deals with an apparatus for treating asphaltic feedstock in which a hydrocarbon solvent is introduced into a compartmentalized contacting tower below the feedstock, and a wash oil solvent is introduced above the feedstock. The contacting tower is formed with an enlarged central compartment in which there is located a conically shaped annulus for interrupting and recycling the flow of wash oil.

13 Claims, 2 Drawing Figures

SOLVENT DEASPHALTING

BACKGROUND OF THE INVENTION

Petroleum residue is composed of asphaltic components and nonasphaltic components which are usually referred to respectively as asphalt and deasphalted oil. The separation of the deasphalted oil from the asphalt is generally achieved through the use of light hydrocarbon solvents which exhibit preferential solubility with respect to the deasphalted oil. The separation takes place in contacting devices which afford multiple stage countercurrent contacting of the solvent and petroleum residue. The present invention is generally applicable to rotating disc type contactors, and specifically relates to the continuous withdrawal of the descending phase. In the usual type of contacting tower, there is no provision for recycling a portion of the descending phase to the upper part of the tower or recovery of the descending phase for use as another interim phase. Thus, the present invention affords new and superior means of washing the ascending phase in a contacting tower for the removal of undesirable products associated with the feedstock, including small particles. In this manner, the undesirable products are eliminated from the deasphalted oil or the asphalt product.

SUMMARY OF THE INVENTION

In accordance with an illustrative embodiment demonstrating features and advantages of the present invention, there is provided an apparatus for separating feedstocks through the countercurrent contact of a dispersed phase in a contacting tower defined by an elongated column formed with an internal chamber. A plurality of annular stator rings are spaced apart from each other and mounted in the internal chamber to form a series of vertically disposed compartments. A rotor including a shaft is rotatably mounted in the internal chamber and a plurality of rotor blades are mounted on the shaft such that each of the rotor blades is disposed within each of the compartments. Also provided are means for conveying the feedstock into one of the compartments, means for conveying a hydrocarbon solvent into one of the compartments, and means for conveying a wash oil solvent out of one of the compartments which is located above the compartment receiving the feedstock. The stator rings are separated into an upper group of rings and a lower group of rings such that an enlarged central compartment is formed which is medially located with respect to the vertical axis of the column. A conically shaped annulus defined by a base and apex is mounted in the central compartment with the apex positioned adjacent the upper group of rings and the base positioned adjacent the lower group of rings. Means below the annulus are provided for receiving a portion of the dispersed phase, such that the flow of the wash oil is interrupted and all or a portion of the wash oil is withdrawn or recycled back to the upper group of rings.

BRIEF DESCRIPTION OF THE DRAWINGS

The above brief description, as well as further objects, features and advantages of the present invention will be more fully appreciated by reference to the following detailed description of presently preferred, but nonetheless illustrative embodiments in accordance with the present invention, when taken in connection with the accompanying drawings wherein.

DESCRIPTION OF THE PREFERRED EMBODIMENTS

Figure 1:
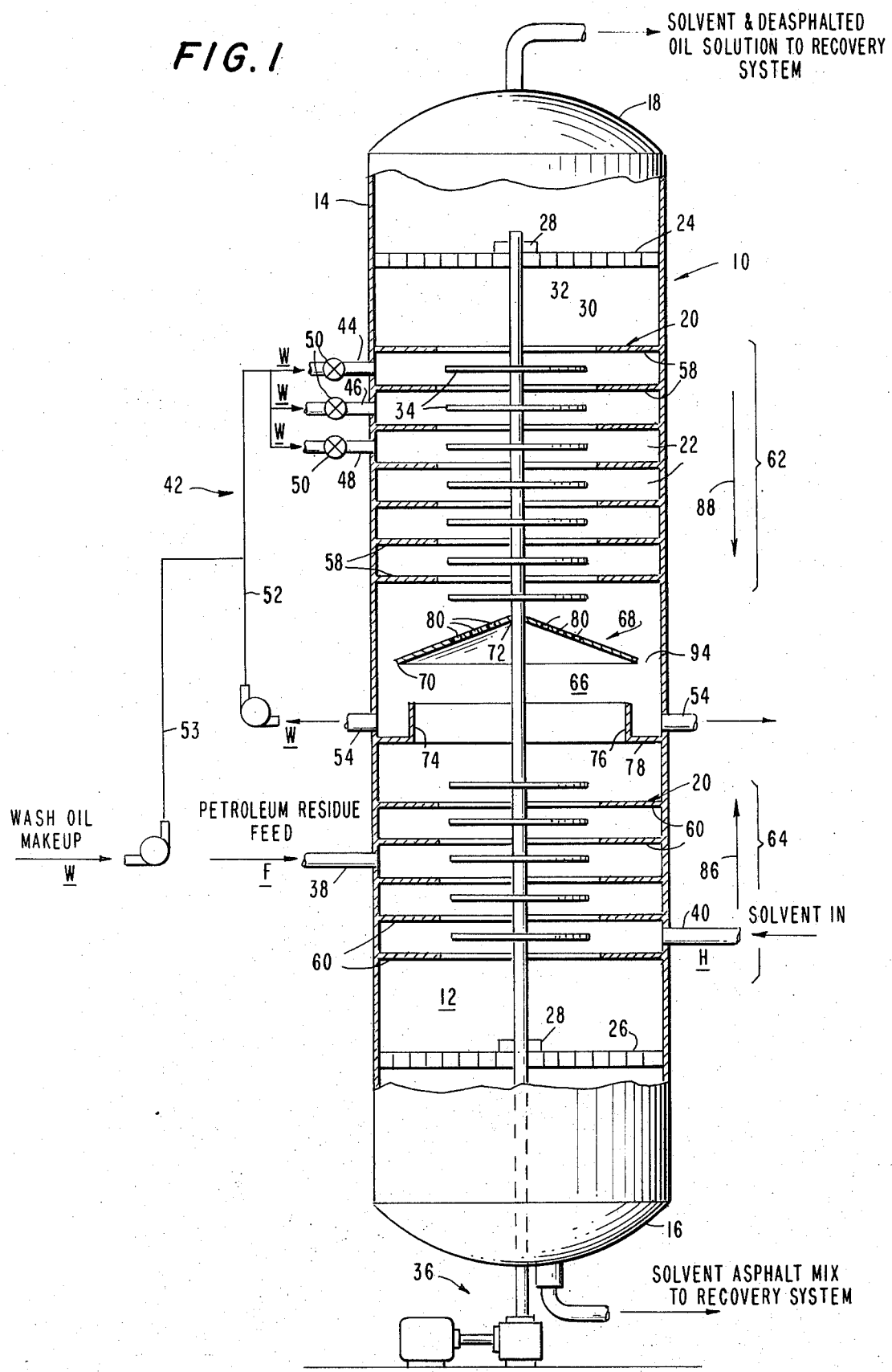
FIG. 1 is a schematic view of a contacting tower showing the rotor-mounted annulus of the present invention.

With reference to FIG. 1, there is shown schematically a contacting tower 10 for treating petroleum residue containing feedstock designated by the leter F. The contacting tower 10 is in the shape of an elongated column formed with an internal chamber 12 which is defined by a cylindrical wall 14, a bottom wall 16, and a top wall 18. A plurality of annular stator rings 20 are mounted in internal chamber 12 on cylindrical wall 14 to form a series of vertically disposed compartments 22 within the internal chamber 12. An upper calming grid 24 and lower calming grid 26 are mounted on cylindrical wall 14 and bearing assemblies 28 are secured to the calming grids. Rotatably mounted in the bearing assemblies 28 is a rotor 30 which includes a shaft 32 and a series of rotor blades 34 mounted along the length of the shaft 32. Each of the rotor blades 34 is located in one of the compartments 22 such that the blades 34 are medially disposed along the length of compartments 22. A variable speed gear motor 36 is coupled to shaft 32 for imparting rotation to the rotor blades 34.

The feedstock F is introduced into one of the compartments 22 by means of a conduit 38; a hydrocarbon solvent designated H is introduced into one of the compartments 22 located below the compartment receiving the feedstock F by means of a solvent conduit 40; and wash oil solvent, designated W is introduced into the compartments 22.

For allowing flexibility in the recycle of the wash oil W, there is provided a wash oil solvent network 42 which includes three wash oil conduits 44, 46 and 48, each of which has a valve 50 in order to afford adjustment to optimum operating conditions. After optimum operation has been established, two of the valves 48 are closed and the optimum wash oil solvent conduit is placed in operation.

The network 42 is comprised of a recycle line 52 in flow communication with outlets 54 which are formed on cylindrical wall 14 and the conduits 44, 46, 48 and a wash oil make-up line 53 which is in flow communication with recycle line 52. When necessary, additional wash oil W can be introduced into the chamber 12 by means of a make-up line 53 which is connected to recycle line 52.

The stator rings 20 are separated into an upper group of rings 58 and a lower group of rings 60, such that the compartments 22 form an upper group of compartments 62 and a lower group of compartments 64, respectively. Medially located along the vertical axis of cylindrical wall 14 is an enlarged central compartment 66 which separates the upper compartments 62 from the lower compartments 64. A conically shaped rotor annulus 68 which is defined by a base 70 and apex 72 is mounted in the central compartment 66. As shown in FIG. 1, the apex 72 is secured to the shaft 32 adjacent to the upper compartments 62, with the base 70 being positioned adjacent to the lower compartments 64. An annular-shaped catch basin 74 is secured to cylindrical wall 14 in the internal chamber 12. The catch basin 74 is formed with a vertically oriented cylindrical wall 76 which is integrally formed with a horizontally oriented shoulder 78 that is mounted to wall 14 below the outlet conduits 54.

As shown in FIG. 1, the rotor annulus 68 is formed with a plurality of through openings 80 which are located near apex 72. The through openings 80 are sized to permit the passage of one-fourth to one-half of the ascending flow in the internal chamber 12. In this manner, the upward velocity is decreased along the base 70 of the rotor annulus 68 to facilitate disengagement of the descending phase.

Figure 2:
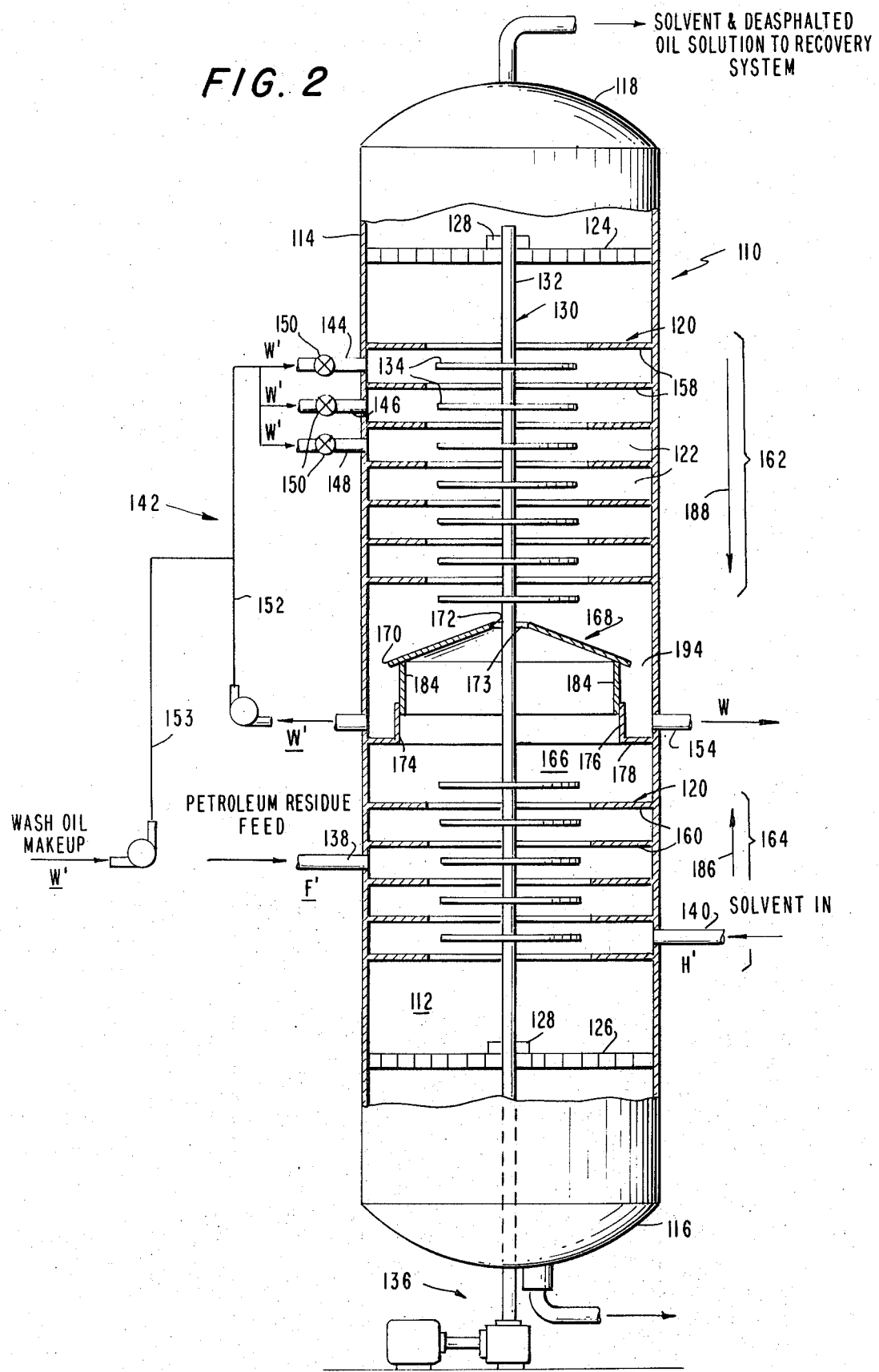
FIG. 2 is a schematic view of a contacting tower showing the stator-mounted annulus of the present invention.

In FIG. 2 there is illustrated a further embodiment of the invention in which corresponding parts have been designated as part of a "100" series. Also, the corresponding streams have been designated by the same reference letters as part of a "prime" series comprising F', W' and H'. In this form of the invention, there is shown schematically a contacting tower 110 for treating petroleum residue containing feedstock designated by the letter F'. The contacting tower 110 is formed with an internal chamber 112 which is defined by a cylindrical wall 114, a bottom wall 116, and a top wall 118. A plurality of annular stator rings 120 are mounted in internal chamber 112 on cylindrical wall 114 to form a series of vertically disposed compartments 122 within the internal chamber 112. An upper calming grid 124 and lower calming grid 126 are mounted on cylindrical wall 114 and bearing assemblies 128 are secured to the calming grids. Rotatably mounted in the bearing assemblies 128 is a rotor 130 which includes a shaft 132 and a series of rotor blades 134 mounted along the length of the shaft 132. Each of the rotor blades 134 is located in one of the compartments 122 such that the blades 134 are medially disposed along the length of compartments 122. A variable speed gear motor 136 is coupled to shaft 132 for imparting rotation to the rotor blades 134.

The feedstock F' is introduced into one of the compartments 22 by means of a conduit 138; a hydrocarbon solvent, designated H' is introduced into one of the compartments 122 located below the compartment receiving the feedstock F' by means of a solvent conduit 140; and wash oil solvent, designated W' is introduced into the compartments 122.

For allowing flexibility in the recycle of the wash oil W', there is provided a wash oil solvent network 142 which includes three wash oil conduits 144, 146 and 148, each of which has a valve 150 in order to afford adjustment to optimum operating conditions. After optimum operation has been established, two of the valves 148 are closed and the optimum wash oil solvent conduit is placed in operation.

The network 142 is comprised of a recycle line 152 in flow communication with outlets 154 which are formed on cylindrical wall 114 and the conduits 144, 146, 148 and a wash oil make-up line 156 which is in flow communication with recycle line 152. When necessary, additional wash oil W' can be introduced into the chamber 112 by means of a make-up line 153 which is connected to recycle line 152.

The stator rings 120 are separated into an upper group of rings 158 and a lower group of rings 160, such that the compartments 122 form an upper group of compartments 162 and a lower group of compartments 164, respectively. Medially located along the vertical axis of cylindrical wall 114 is an enlarged central compartment 166 which separates the upper compartments 162 from the lower compartments 164. A conically shaped stator annulus 168 which is defined by a base 170 and apex 172 is mounted in the central compartment 166. As shown in FIG. 2, the apex 172 is provided with a central opening 173, such that the annulus 168 is spaced apart from the shaft 132 adjacent to the upper compartments 162, with the base 170 being positioned adjacent to the lower compartments 158. An annular-shaped catch basin 174 is secured to cylindrical wall 114 in the internal chamber 112. The catch basin 174 is formed with a vertically oriented cylindrical wall 176 which is integrally formed with a horizontally oriented shoulder 178 that is mounted to wall 114 below the outlet conduits 154. The stator annulus 168 is mounted on catch basin 174 by a plurality of support rods 184 which are secured to the wall 176 and above the base 170.

In the case of both the contacting towers 10, 110, the annulus 68, 168 is sized such that an annular space 94, 194 is formed between the periphery of base 70, 170 and cylindrical wall 14, 114 and it is preferable that the area of annular space 94, 194 be slightly less than one-half the cross-sectional area of the wall 14, 114. Also, the catch basin 84, 184 is sized such that the area within cylindrical wall 76, 176 is slightly less than one-half the cross-sectional area of the wall 14, 114. In this manner, a small degree of overlap is created by the base 70, 170 overhanging catch pan basin 74, 174 and all of the descending phase falling from the base 70, 170 will be received by catch basin 74, 174. it is also preferable that the vertical area between the apex 72, 172 and the top rim of cylindrical wall 76, 176 be approximately one-half the horizontal cross-sectional area of the wall 14, 114.

By progressively inspecting the directional arrows 86, 186 and 88, 188 which respectively designate the ascending phase and descending phase in the internal chamber 12, 112, it can be appreciated that a portion of the wash oil W, W' is interrupted by the annulus 68, 168, and a portion of the wash oil W is recycled through line 52, 152 back to the upper group of compartments 62, 162.

Thus, in accordance with the rotor annulus 68 and stator annulus 168 of the present invention, it is possible to interrupt the flow of wash oil W, W' by means of the catch basin 74, 174 for recycling back to the top of the contacting tower 10, 110.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A contacting tower for separating feedstocks through the countercurrent contact of a dispersed phase, comprising an elongated column formed with an internal chamber, a plurality of annular stator rings spaced apart from each other and mounted in said internal chamber to form a series of vertically disposed compartments, a rotor including a shaft rotatably mounted in said internal chamber and a plurality of rotor blades mounted on said shaft such that each of said rotor blades is disposed within each of said compartments, means for conveying said feedstock into one of said compartments, means for conveying a hydrocarbon solvent into one of said compartments, means for conveying a wash oil solvent out of one of said compartments which is located above the compartment receiving said feedstock, said stator rings being separated into an upper group of rings and a lower group of rings such that an enlarged central compartment is formed which is medially located with respect to the vertical axis of said column, a conically shaped annulus defined by a base and apex mounted in said central compartment with said apex being positioned adjacent said upper group of rings and said base positioned adjacent said lower group of rings, and means below said annulus for receiving a portion of said dispersed phase, such that the flow of said wash oil is interrupted, and means for recycling said portion back to said upper group of rings.

2. A contacting tower according to claim 1 in which means are provided for removing all of said wash oil from said tower.

3. A contacting tower according to claim 1 in which means are provided for recycling all of said wash oil back to said upper group of rings.

4. A contacting tower according to claim 1 in which means are provided for removing a portion of said wash oil from said tower.

5. A contacting tower according to claim 1 in which a conically shaped annulus consists of said rotor mounted on said shaft.

6. A contacting tower according to claim 5 in which said annulus is formed with through holes located at said apex and said through holes sized to permit passage of a portion of said ascending phase.

7. A contacting tower according to claim 6 in which said through holes are sized to permit passage of from one-fourth to one-half of the flow of said ascending phase.

8. A contacting tower according to claim 5 in which said base is sized such that the cross-sectional area of said base is less than one-half the cross-sectional area of said internal chamber.

9. A contacting tower according to claim 8 in which said overlap section has a cross-sectional area which is substantially equal to one-half of the cross-sectional area of said internal chamber.

10. A contacting tower according to claim 1 in which said means below said annulus consists of an annular-shaped catch basin mounted in said internal chamber.

11. A contacting tower according to claim 10 in which said base is sized to overlap said catch basin so as to define an annular overlap section.

12. A contacting tower according to claim 10 in which said conically-shaped annulus consists of a stator mounted on said annular catch basin.

13. A contacting tower according to claim 12 in which said through holes are sized to permit passage of from one-fourth to one-half of the flow of said ascending phase.

* * * * *